US008926306B2

(12) United States Patent
Harrison

(10) Patent No.: US 8,926,306 B2
(45) Date of Patent: Jan. 6, 2015

(54) FOOD PRODUCT PRESS

(71) Applicant: Peter Harrison, Aurora (CA)

(72) Inventor: Peter Harrison, Aurora (CA)

( * ) Notice: Subject to any disclaimer, the term of this patent is extended or adjusted under 35 U.S.C. 154(b) by 0 days.

(21) Appl. No.: 13/999,361

(22) Filed: Feb. 18, 2014

(65) Prior Publication Data

US 2014/0234465 A1   Aug. 21, 2014

Related U.S. Application Data

(60) Provisional application No. 61/850,612, filed on Feb. 20, 2013.

(51) Int. Cl.
*A47J 43/20*   (2006.01)

(52) U.S. Cl.
CPC ...................... *A47J 43/20* (2013.01)
USPC .............. 425/299; 425/96; 425/98; 425/238; 425/278; 425/298; 425/300; 425/295; 425/296; 425/297; 425/306; 425/309; 425/310; 425/311; 425/313; 425/314; 220/529; 220/530; 99/349; 99/351; 99/352; 99/353; 99/426; 99/427; 99/430; 99/439

(58) Field of Classification Search
CPC .............. A21C 5/00; A21C 5/02; A21C 5/08; A21C 11/10; A21C 11/103; A21C 11/12; B26B 3/04; B26D 3/24; B26D 3/245; B26D 3/26; A47J 43/20
USPC ............. 425/96, 98, 238, 278, 298, 299, 300, 425/295, 296, 297, 306, 309, 310, 311, 313, 425/314; 220/529, 530; 99/349, 351, 352, 99/353, 426, 427, 430, 439
See application file for complete search history.

(56) References Cited

U.S. PATENT DOCUMENTS

| | | | | | |
|---|---|---|---|---|---|
| 22,330 | A | * | 12/1858 | Manning | 425/299 |
| 56,241 | A | * | 7/1866 | Manning | 425/310 |
| 71,831 | A | * | 12/1867 | Witherell | 425/300 |
| 109,529 | A | * | 11/1870 | Manning | 425/310 |
| 194,244 | A | * | 8/1877 | Jasper | 83/123 |
| 208,522 | A | * | 10/1878 | Jasper | 425/300 |
| 230,294 | A | * | 7/1880 | Lincoln | 30/359 |
| 384,964 | A | * | 6/1888 | Day | 425/300 |
| 410,682 | A | * | 9/1889 | Berry | 30/303 |
| 683,956 | A | * | 10/1901 | Loose | 84/437 |
| 834,887 | A | * | 11/1906 | Calhoun | 425/168 |
| 1,183,731 | A | * | 5/1916 | Hopkins | 425/118 |
| 1,578,761 | A | * | 3/1926 | Rondolin | 426/503 |
| 1,859,762 | A | * | 5/1932 | Blum | 425/142 |
| 1,892,633 | A | * | 12/1932 | Regel | 425/297 |
| 2,008,725 | A | * | 7/1935 | Parker | 249/74 |
| 2,097,042 | A | * | 10/1937 | Rausch | 425/200 |
| 2,346,242 | A | * | 4/1944 | Turner | 30/359 |
| 2,618,227 | A | * | 11/1952 | Schmittroth | 425/95 |
| 2,642,899 | A | * | 6/1953 | Simmons et al. | 138/157 |
| 4,250,618 | A | * | 2/1981 | Custer et al. | 30/114 |
| 4,765,029 | A | * | 8/1988 | Rogan | 425/444 |
| 5,832,800 | A | * | 11/1998 | Donoghue | 83/467.1 |
| 2011/0203463 | A1 | * | 8/2011 | Anderson et al. | 99/486 |

* cited by examiner

*Primary Examiner* — Timothy Kennedy

(57) ABSTRACT

A food product press having a mold base, a press assembly having a plurality of press bodies, and blade spaces between the press bodies, a plurality of blades slidable within the blade spaces, and a blade operating mechanism for moving the blades relative to the press bodies.

2 Claims, 4 Drawing Sheets

FOOD PRODUCT PRESS

This application is based on U.S. Provisional Application No. 61/850,612, filed Feb. 20, 2013, Title: Food Product Press; Inventor: Peter Harrison, the priority of which is claimed.

FIELD OF THE INVENTION

The invention relates to a food press for making shaped food products ready for cooking and in particular for making shaped patties of ground meat.

BACKGROUND OF THE INVENTION

Numerous food products are made by producing shapes from a food mix. Cookie cutters are typical, for cutting uncooked cookie mix. Such machines are used in large bakeries and the cooked products are packaged and shipped to stores and consumed weeks after they are made. However when making products from ground meats, particularly hamburger patties, customer preferences usually dictate that such patties should be made from fresh produce, and shall be prepared and ready to cook, and if possible should be cooked as soon as the patty is shaped. There are of course a large number of examples of frozen patties but these are generally considered to have less customer appeal. Such fresh meat patties may typically be produced by a small neighbourhood local butcher. They may also be required to be produced for cooking at some particular event or institution. In many cases when cooking at home, such patties are shaped by hand, but this is not suitable for use even on a small scale production. In addition, it is difficult to regulate the size of the individual patties, so that the product is uniform in size and shape.

Another factor which has become desirable, is that there are some meat patties which are a conventional size, typically for example, one quarter of a pound. On the other hand, there are much small meat patties known as "sliders" which are much smaller. Producing such sliders even on a relatively small scale, in reasonable numbers is time consuming and labour intensive. In addition, since the normal selling price of such sliders will be much less that the price of a conventional meat patty, it will be appreciated that there is little margin available to cover manual labour costs. It is therefore desirable to provide a food product press which is capable of producing both larger food products and smaller food products in the same press with minor modifications. It is desirable to provide a press at a reasonable cost so that it may be kept, for example, by a local butcher or local restaurant or institution as a piece of kitchen equipment, available for use when required.

BRIEF SUMMARY OF THE INVENTION

The invention provides a food product press having a mould base, a press assembly having a plurality of press bodies, and blade spaces between said press bodies, a plurality of blades slidable within said blade spaces, and a blade operating mechanism for moving said blades relative to said press bodies.

Preferably, the invention provides such a press with a plurality of blades fixed within the press, and a further plurality of interchangeable blades inter-lockable with the fixed blades, for varying the number of food products made.

Preferably, the invention provides such a press wherein the blade operating mechanism incorporates a press lock position and press operating position, and manual means for operating between the two positions.

Preferably, the invention provides such a food product press and incorporating a food product support tray, and a mould body, and wherein the tray is slideable into an out of mould body.

Preferably, the invention provides such a food product press incorporating tray locking means whereby the tray can be locked in its inserted position for operation.

The invention also provides in an alternate embodiment a simplified form of press, capable of making a smaller number of patties, typically the so called "sliders", and having a means for adjusting the thickness of such patties.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 3a is an enlarged exploded detail of FIG. 3; and,

DESCRIPTION OF A SPECIFIC EMBODIMENT

Figure 1:
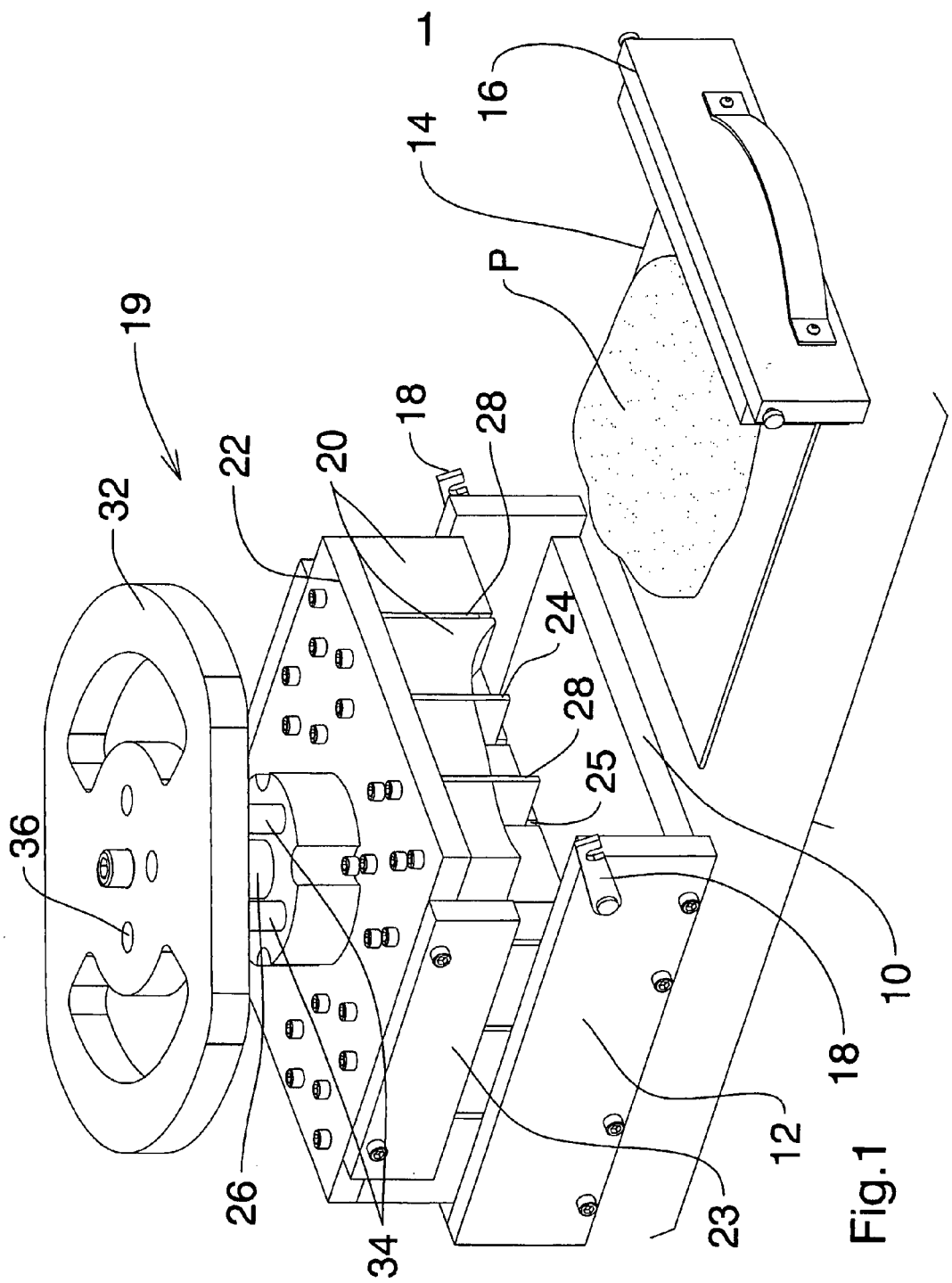
FIG. 1 is a perspective illustration of a food product press in a first position, with a food product being introduced into the press.
Figure 2:
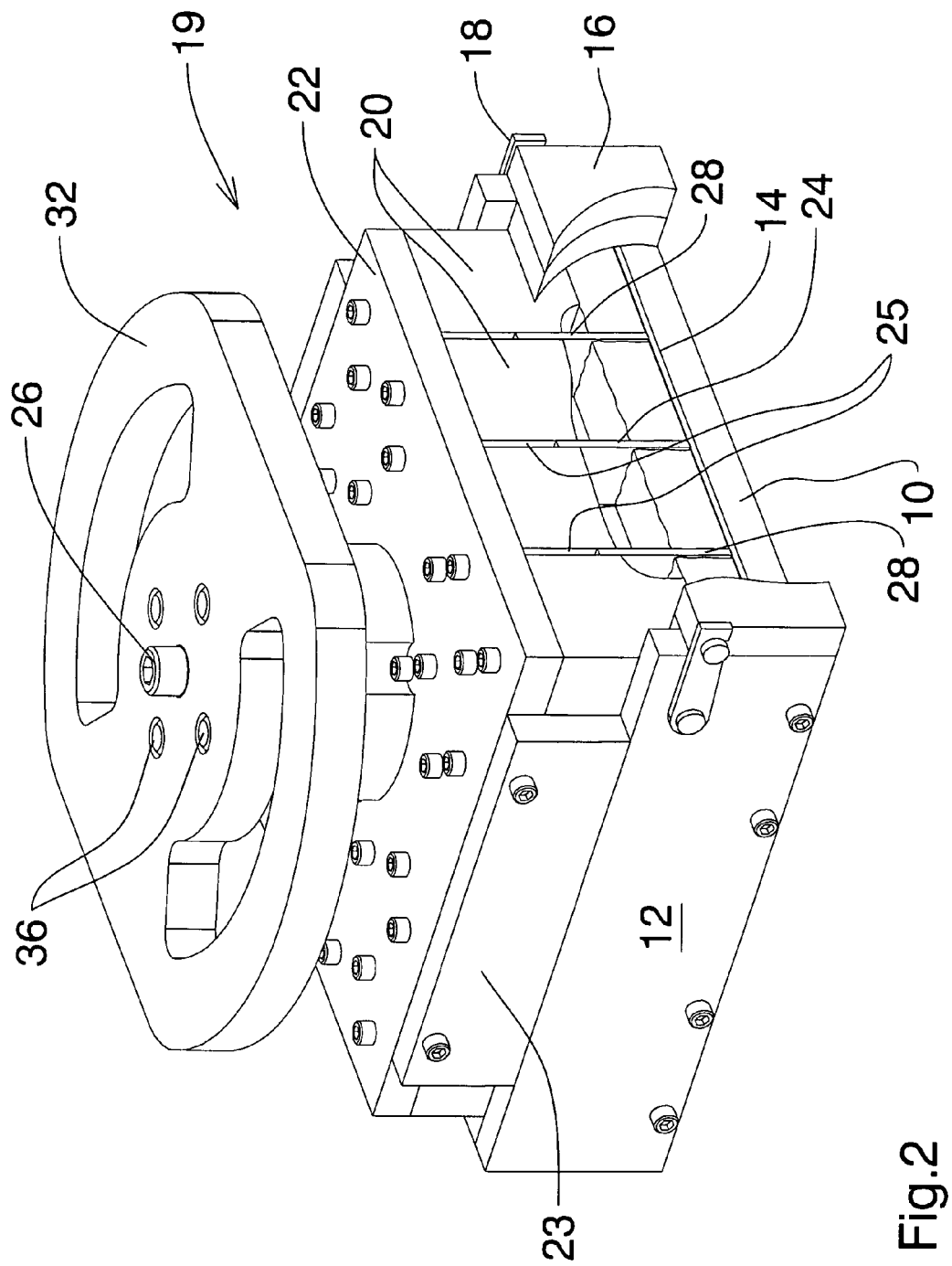
FIG. 2 is a perspective illustration corresponding to FIG. 1 showing the press in a second position with the blades depressed and dividing the food product into a plurality of patties.
Figure 3:
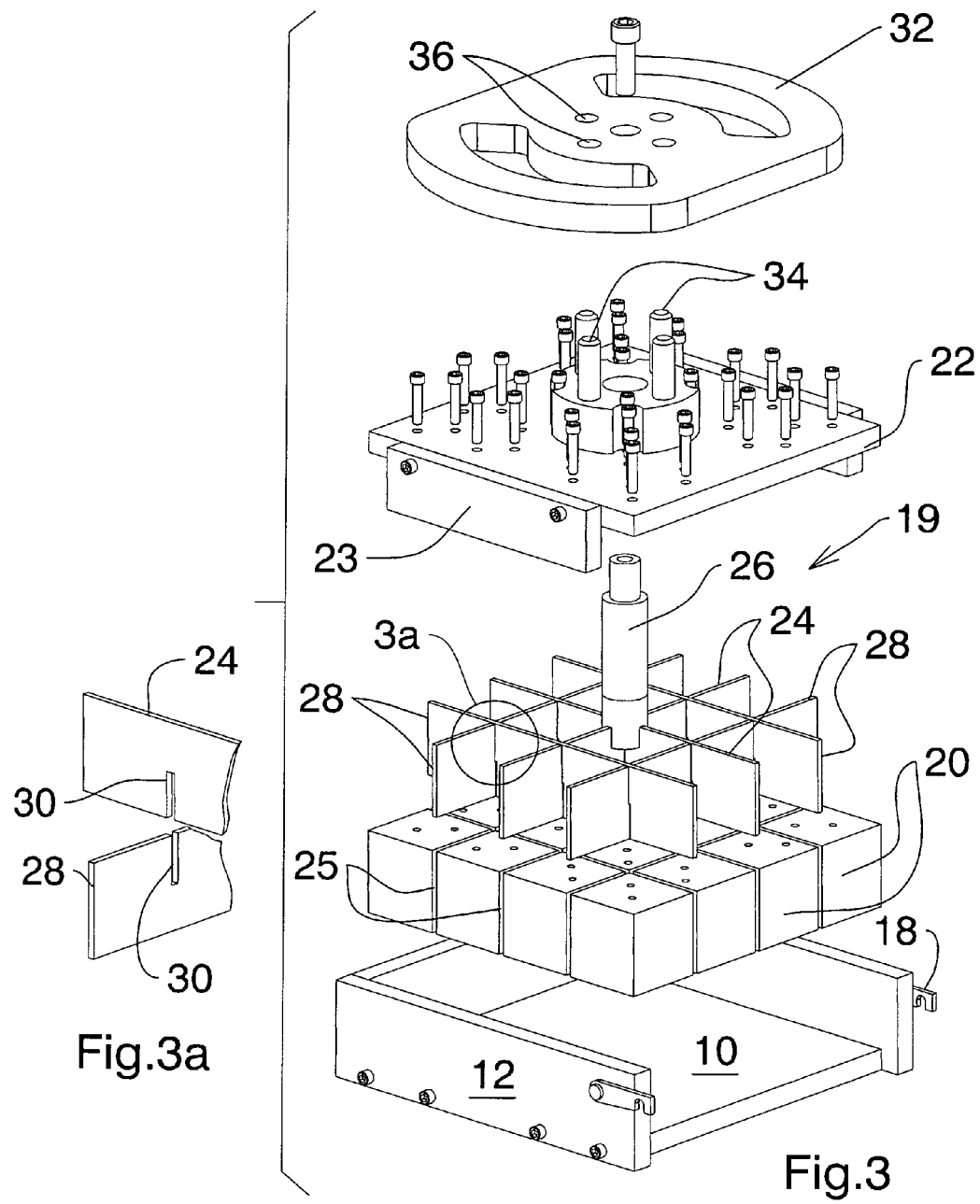
FIG. 3 is an exploded perspective illustration of the food product press of FIGS. 1 and 2.

Referring now to FIGS. 1, 2 and 3, the invention will be seen to be illustrated in the form of a food product press, having a mould body, comprising a flat base (10) and three sidewalls (12). For the sake and convenience, a removable tray (14) is provided on which a food product (P) can be placed. The tray has a side wall (16), which will effectively close the mould body. Latches (18) will hold the tray in position. A pressure assembly (19) can be removeably placed on top of mould body (10 and 12). Pressure assembly (19) comprises a frame plate (22) and pressure bodies (20) which are rectangular solid members, in this case, each being a square cross section and are secured to frame plate (22) by suitable bolts.

The bodies (20) define lower contact surfaces, all lying in a common plane. The bodies (20) are separated by slots (25).

The frame plate (22) has two side walls (23) attached along the opposite edges, which are designed to nest on top of side walls (12) of the mould body.

In order to form individual patties, there are four main blades (24) connected to a central operating column (26) and a further four removable blades (28). The blades (24) and (28) have inter-digitating slots (30) (FIG. 3a). In this way the blades when fully assembled, can define sixteen food products, or when the removable blades (28) are removed, the remaining blades (24) will define four products. The blades (24, 28) fit within slots (25) as shown.

An operating handle (32) is connected to the central column (26) and is rotatable between two positions as shown in FIGS. 1 and 2.

In FIG. 1, it will be seen that the pressure assembly (19) and its connected members are shown in a raised position above but out of contact the mould body (10 and 12) and tray (14) is shown supported by a plate (40).

IN OPERATION

The food product (P) is placed in position on mould body (10).

The entire pressure assembly (19) consisting of frame plate (22) and its connected members, and the pressure bodies (20) is then lowered down until walls (23) contact the side walls (12) (FIG. 2). This will have the effect of flattening out the food product (P) until it fills the space between side walls (12). In this position, the operating handle is held upwardly by posts (34).

In FIG. 2, the operating handle has been rotated so as to bring the posts (34) into registration with the holes (36) in the handle. This will allow the handle to be depressed, forcing the column (26) downwardly. This in turn will cause the blades to extend below the pressure bodies and separate the food product into respective patties. The blades are then raised upwardly, and the handle is again rotated in the reverse direction.

The entire pressure assembly (19) and pressure bodies may simply be raised and put on one side. The tray is unlatched and removed. The individual food patties, either sixteen or four, in this particular embodiment, will be available on the tray for further processing. In this way it is possible for an operator to repeatedly produce patties of a pre-determined size. All that is required is to ensure that the initial amount of food product placed on the tray is the same weight, in total. For example, one pound of ground meat, will produce either four patties, each of quarter pound size or sixteen patties, each being one ounce.

Clearly the invention is not restricted solely to either the provision of four patties or sixteen, but is adaptable to variations. In addition, the invention is not solely restricted to producing patties of square shape but could be producing patties of various different shapes, or even a single patty or shape if desired. The apparatus would be made of stainless steel and/or food grade plastic to reduce costs.

The press can be used for many different food products, such as cookies, or even animal foods.

Figure 4:
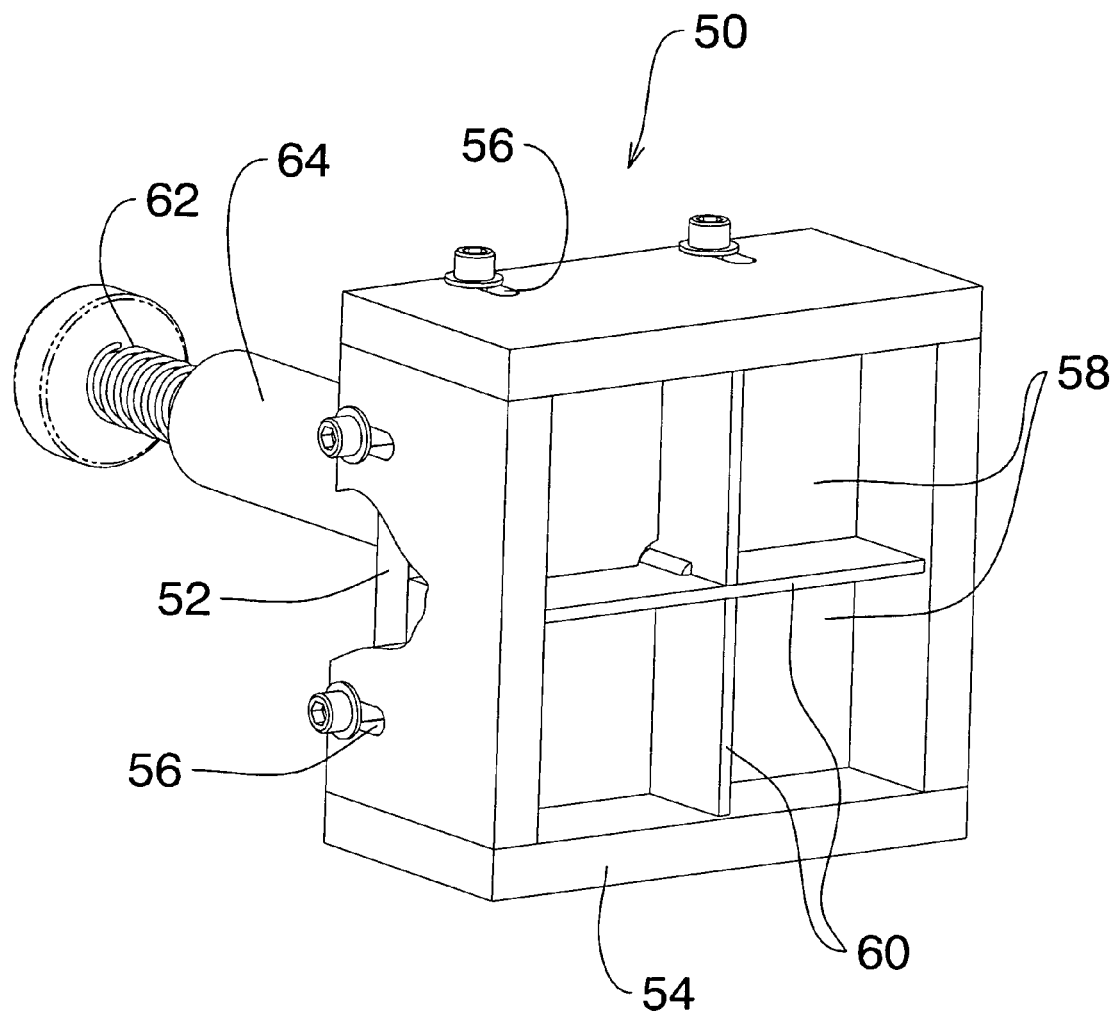
FIG. 4 is a lower perspective illustration of a simplified form of food product press.

A simplified form of the invention may be provided in an alternate embodiment as illustrated in FIG. 4. In this case, the press would be used to form patties on any suitable clean surface. The mould body would not be required.

For this purpose, the press illustrated generally as (50) comprises a pressure plate (52) to which are attached four side walls (54). Side walls (54) have slots (56), receiving suitable fastenings. The side walls (54) may be adjusted up or down within the limit of the slots to vary the thickness of the food product.

Four pressure bodies (58) are attached to the underside of pressure plate (52) The pressure bodies (58) are square in shape and are separated apart and define slots. Blades (60) are received in the slots between the pressure bodies.

Secured on the upper side of plate (52) is a spring loaded operating shaft (62). Operating shaft (62) is received in the sleeve (64) which is secured, for example by welding (not shown) to the upper side of plate (52).

In operation, a suitable quantity of food product (not shown) is placed on a flat clean surface.

The press (50) is then placed directly over the food product and is lowered down until the edges of side walls (54) touch the flat surface.

This will then flatten out the food product so that it fills the space between the four side walls (54).

The operating shaft (62) is then operated to press the blades (60) down into the food product, thus separating the food product into four separate rectangular patties (not shown).

The entire press (50) is then simply lifted upwardly leaving the four patties on the flat surface.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A food product press for shaping food products, comprising;
    a mould body having a flat base and at least three side walls around said flat base, for receiving a quantity of said food product;
    pressure assembly having a plurality of pressure bodies, and wherein
    said pressure bodies define lower surfaces lying in a common plane, and wherein
    said pressure assembly includes a frame plate, with said pressure bodies being secured to said frame plate, said pressure bodies being arranged in spaced apart relation, and edge walls attached to said frame plate, interengageable with some said side walls on said mould body;
    slots between said pressure bodies;
    a plurality of shaping blades in said slots;
    an operating mechanism for moving said blades in said slots into and out of a food product, wherein said operating mechanism includes an operating shaft extending through said frame plate, connected to said blades, movement of said operating shaft moving all of said blades simultaneously, and wherein said shaping blades include a first set of fixed blades secured to said operating shaft, and a second set of interchangeable blades inter-engageable with said fixed blades, whereby said blades may be arranged to shape food products in different sizes;
    a handle on said operating shaft;
    posts located on said mounting plate, and,
    openings in said handle adapted to register with said posts and said handle being rotatable between two positions, in one position wherein said holes locate directly in registration with said posts, and another position wherein said holes are out of registration.

2. A food product press for shaping food products as claimed in claim 1 including a tray, slidably located in said mould body, and a side wall on said tray, and means for locking said side wall in position in said mould base.

* * * * *